US012276406B1

(12) United States Patent
Xu et al.

(10) Patent No.: US 12,276,406 B1
(45) Date of Patent: Apr. 15, 2025

(54) LED LAMP WITH QUICK DISASSEMBLING STRUCTURE

(71) Applicant: SHENZHEN SNC OPTO ELECTRONIC CO., LTD., Guangdong (CN)

(72) Inventors: Jianyong Xu, Guangdong (CN); Anle Zhao, Guangdong (CN); Shengkang Chen, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/672,081

(22) Filed: May 23, 2024

(30) Foreign Application Priority Data

Jan. 12, 2024 (CN) ......................... 202420080625.2

(51) Int. Cl.

| | |
|---|---|
| ***F21V 17/16*** | (2006.01) |
| ***F21S 8/00*** | (2006.01) |
| ***F21V 17/06*** | (2006.01) |
| ***F21V 23/00*** | (2015.01) |
| ***F21V 31/00*** | (2006.01) |
| *F21Y 105/14* | (2016.01) |
| *F21Y 115/10* | (2016.01) |

(52) U.S. Cl.
CPC ............ *F21V 17/164* (2013.01); *F21S 8/036* (2013.01); *F21V 17/06* (2013.01); *F21V 23/008* (2013.01); *F21V 31/005* (2013.01); *F21Y 2105/14* (2016.08); *F21Y 2115/10* (2016.08)

(58) Field of Classification Search
CPC .... F21V 17/164; F21V 23/008; F21V 21/008; F21V 17/06
See application file for complete search history.

(56) References Cited

U.S. PATENT DOCUMENTS

2021/0080085 A1* 3/2021 Hu ........................ F21V 17/164
2022/0221136 A1* 7/2022 Wilz ......................... F21V 5/00

* cited by examiner

*Primary Examiner* — Karabi Guharay

(57) ABSTRACT

An LED lamp includes a lamp body provided with a mounting groove on a front side thereof; an LED lamp panel mounted in the mounting groove; a driving power supply electrically connected to the LED lamp panel and configured to power the LED lamp panel; a light transmitting panel mounted in the mounting groove; and a quick disassembling structure through which the light transmitting panel being detachably connected to the lamp body.

8 Claims, 8 Drawing Sheets

LED LAMP WITH QUICK DISASSEMBLING STRUCTURE

CROSS-REFERENCE TO RELATED APPLICATIONS

This application claims priority of Chinese Utility Model application No. 202420080625.2, filed on Jan. 12, 2024, entitled “LED LAMP”, the entire content of which is incorporated herein in its entirety.

TECHNICAL FIELD

The present disclosure relates to lighting devices, and in particular to an LED lamp.

BACKGROUND

LED lamps have many advantages such as energy saving, environmental protection, long life, and have been widely used in various lighting places. However, when replacing a lens panel or an LED lamp panel, multi-step disassembly is required, and parts fixed by screws shall be disassembled and assembled with tools, which is inconvenient and time-consuming, and it is difficult to replace the lens panel or the LED lamp panel of the LED lamp quickly and conveniently. Therefore, it is necessary to improve a structure of the LED lamp.

SUMMARY

Accordingly, the present disclosure provides an LED lamp, a light transmitting panel or the LED lamp panel of which can be replaced without an additional tool.

An LED lamp includes a lamp body provided with a mounting groove on a front side thereof; an LED lamp panel mounted in the mounting groove; a driving power supply electrically connected to the LED lamp panel and configured to power the LED lamp panel; a light transmitting panel mounted in the mounting groove; and a quick disassembling structure through which the light transmitting panel being detachably connected to the lamp body.

In one of the embodiments, the quick disassembling structure includes a locking member provided on the lamp body and an unlocking member provided on the light transmitting panel, the locking member includes a vertical plate fixed on the lamp body and a horizontal plate connected to the vertical plate, the unlocking member is an integrally formed buckle buckled with the horizontal plate.

In one of the embodiments, the unlocking member is substantially “U”-shaped and includes an elastic handle and a locking block, the locking block protrudes outwardly from a middle portion of the elastic handle to form a step between the locking block and the elastic handle, the step is engaged with the horizontal plate, when the elastic handle is pressed away from the vertical plate, the step is disengaged from the horizontal plate.

In one of the embodiments, at least two quick disassembling structures are provided.

In one of the embodiments, the light transmitting panel is a lens panel.

In one of the embodiments, the light transmitting panel covers the LED lamp panel.

In one of the embodiments, the LED lamp further includes a power supply box mounted on a rear side of the lamp body, the driving power supply is provided in the power supply box.

In one of the embodiments, the power supply box is buckled with the lamp body.

In one of the embodiments, the LED lamp further includes a sealing ring provided between the power supply box and the lamp body, the power supply box is provided with a sealing groove, and the sealing ring is received in the sealing groove.

In one of the embodiments, the LED lamp further includes a mounting bracket connected to the lamp body and a hanging ring connected to the power supply box.

These and other objects, advantages, purposes and features will become apparent upon review of the following specification in conjunction with the drawings.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

REFERENCE SIGNS

Figure 1:
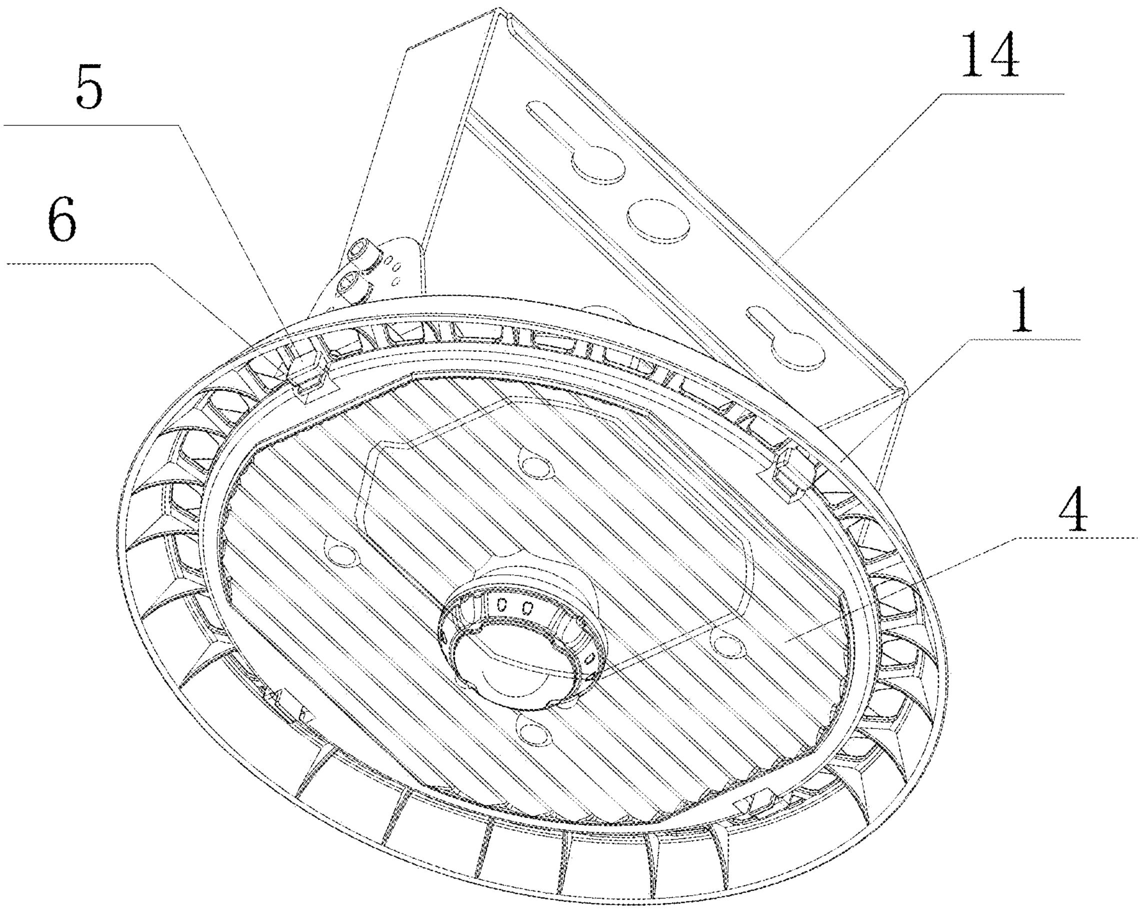
FIG. 1 is a perspective view of an LED lamp according to an embodiment of the present disclosure.

1. Lamp body; 2. LED lamp panel; 3. Driving power supply; 4. Light transmitting panel; 5. Locking member; 6. Unlocking member; 7. Horizontal plate; 8. Vertical plate; 9. Handle; 10. Locking block; 11. Step; 12. power supply box; 13. Sealing ring; 14. Mounting bracket; 15. Hanging ring; 16. Mounting groove.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms “upper”, “lower”, “front” and “rear”, “left”, “right”, “vertical”, “horizontal”, “lateral”, “longitudinal”, “top”, “bottom”, “inner”, “outer”, and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
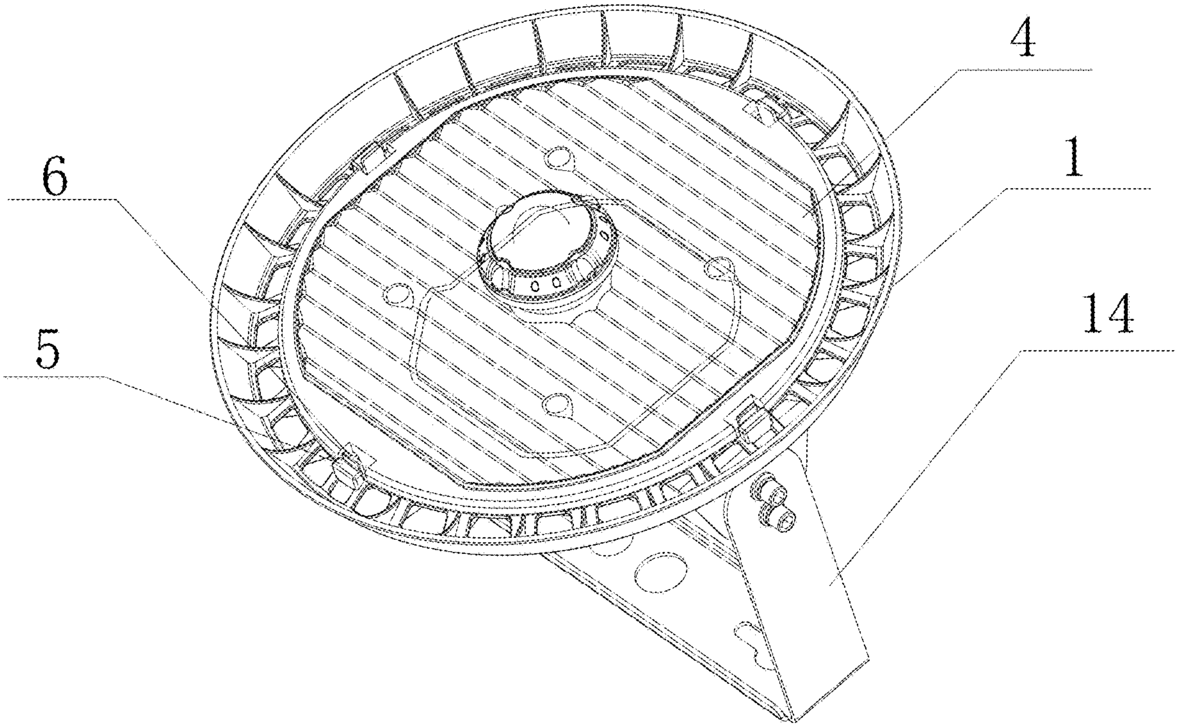
FIG. 2 is similar to FIG. 1, but viewed from another aspect.
Figure 3:
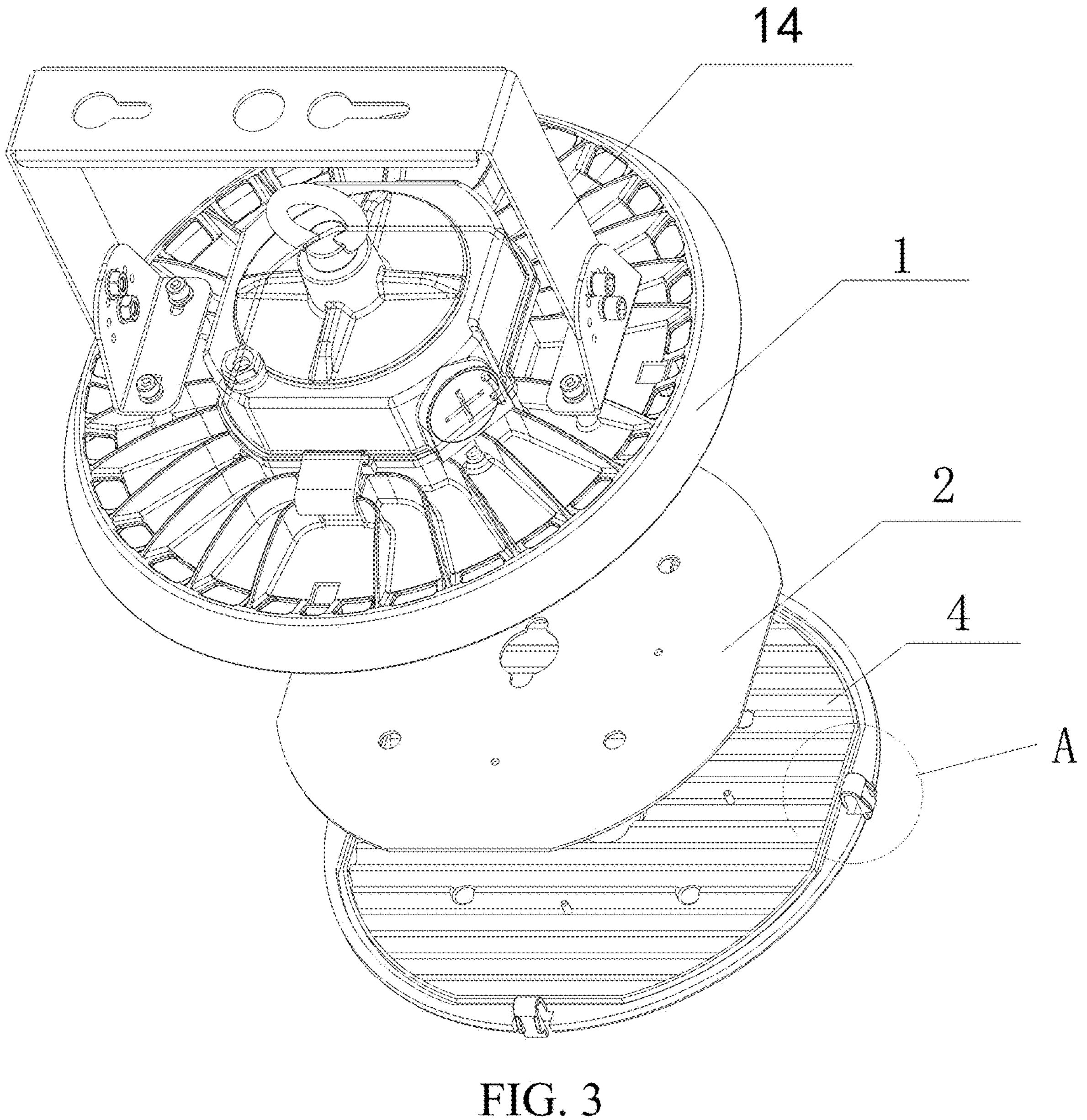
FIG. 3 is a first exploded view of the LED lamp of FIG. 1.
Figure 4:
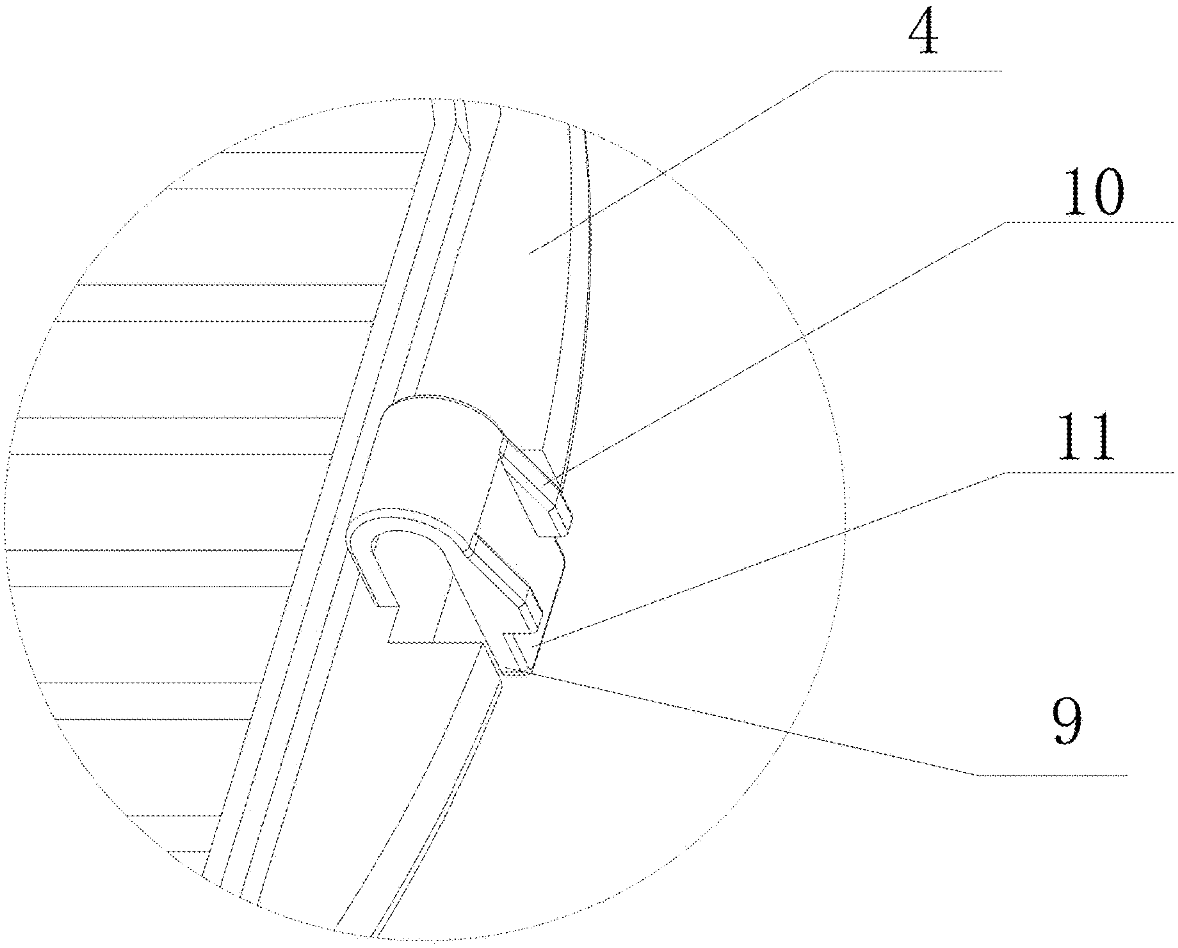
FIG. 4 is an enlarged view of portion A of FIG. 3.
Figure 5:
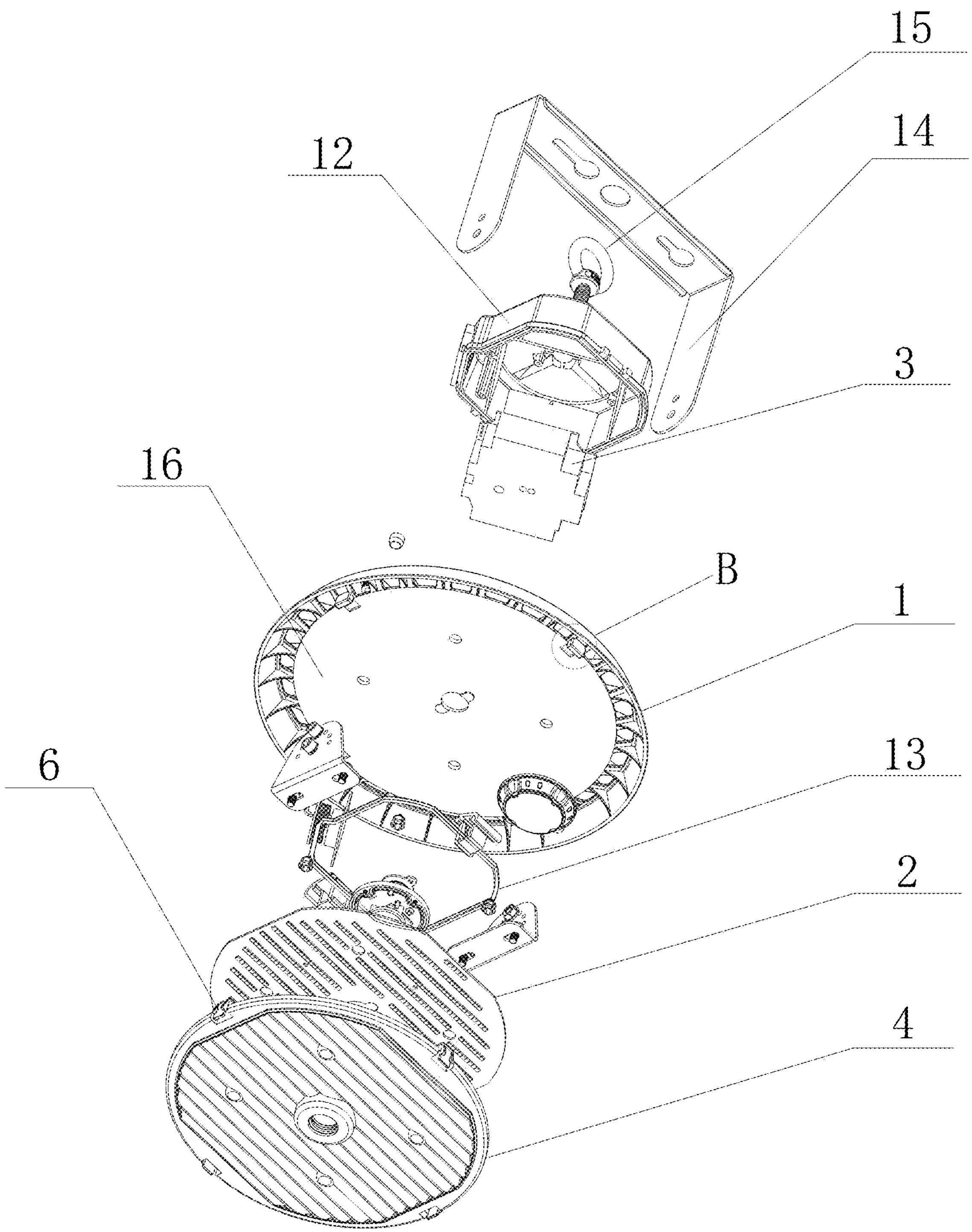
FIG. 5 is a second exploded view of the LED lamp of FIG. 1.
Figure 6:
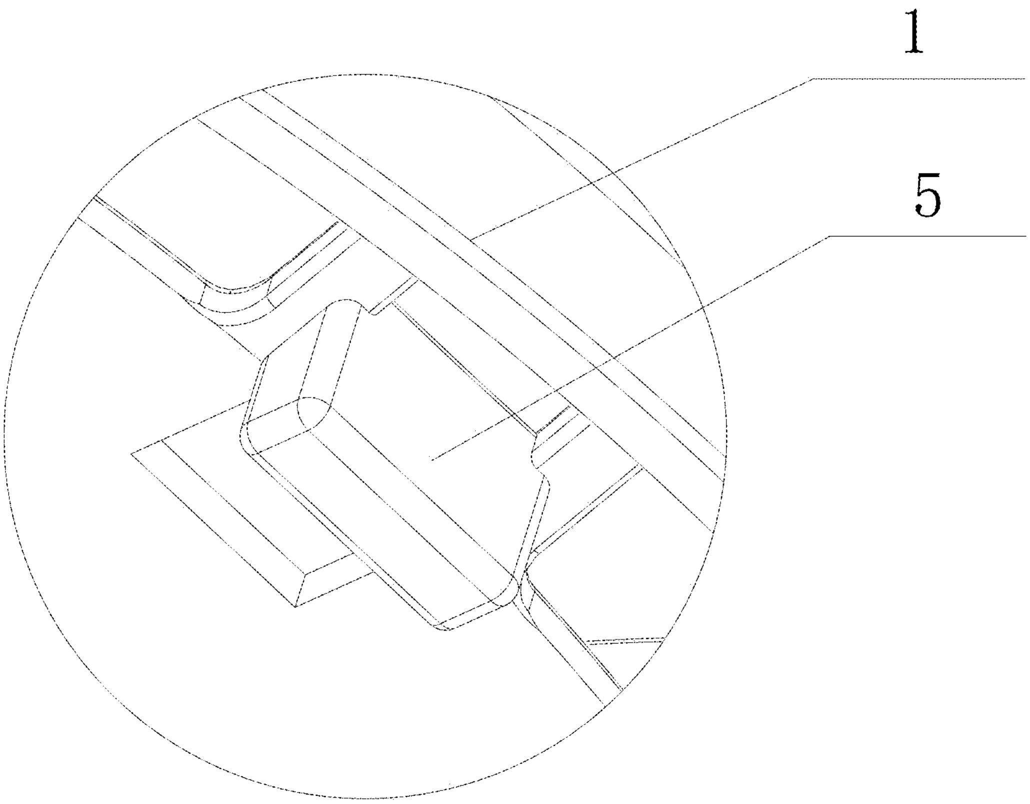
FIG. 6 is an enlarged view of portion B of FIG. 5.
Figure 7:
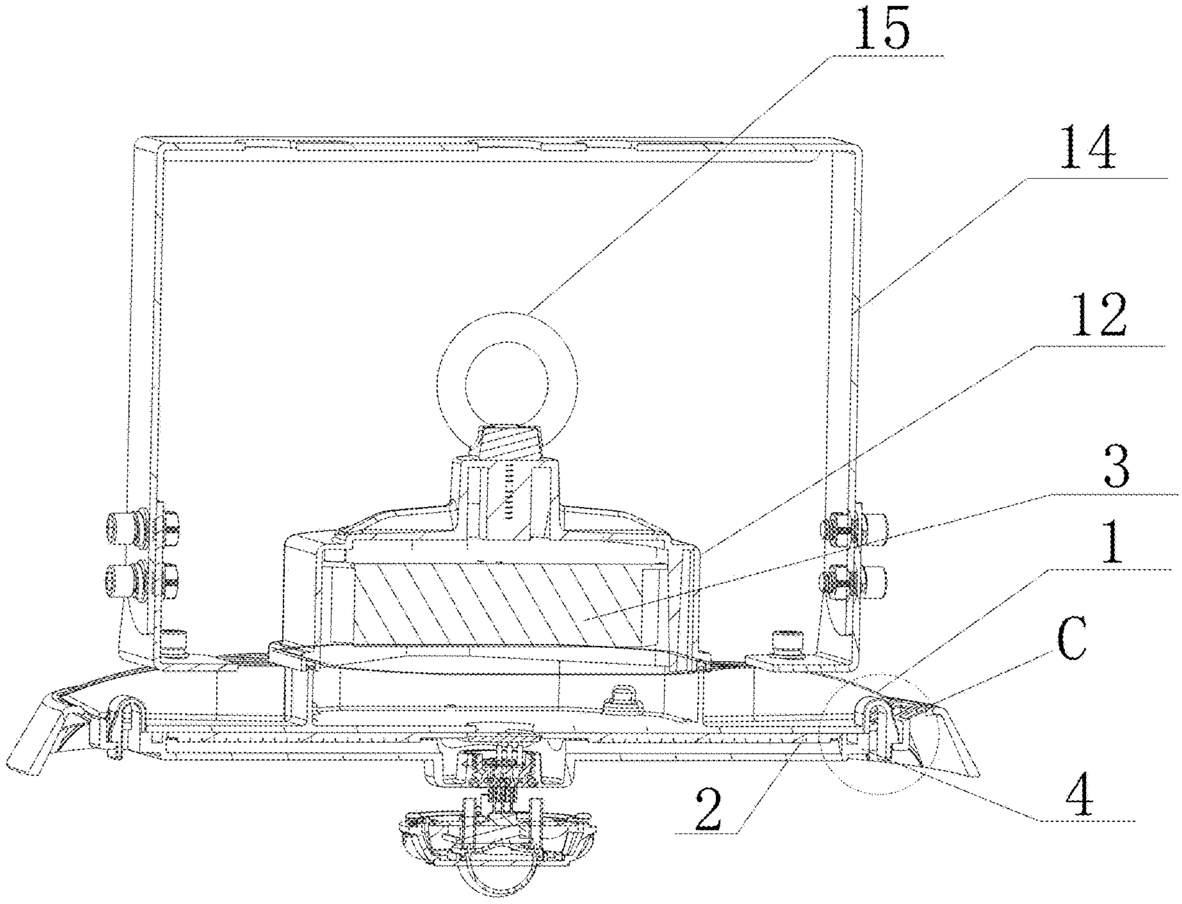
FIG. 7 is a cross-sectional view of the LED lamp of FIG. 1.
Figure 8:
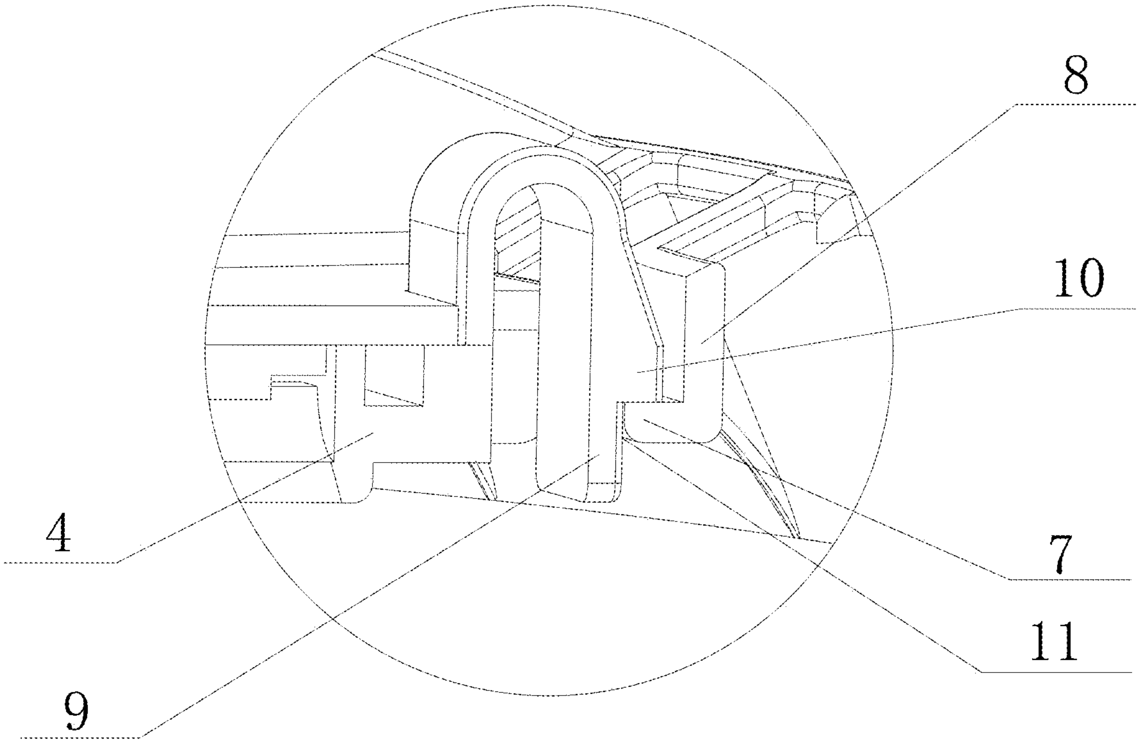
FIG. 8 is an enlarged view of portion C of FIG. 7.

Referring to FIGS. 1 to 8, an LED lamp is provided according to an embodiment of the present disclosure. The LED lamp includes a lamp body 1, an LED lamp panel 2, a driving power supply 3, a light transmitting panel 4, and a quick disassembling structure. The driving power supply 3 is configured to power the LED lamp panel 2. A front side of the lamp body 1 is provided with a mounting groove 16. Both the LED lamp panel 2 and the light transmitting panel 4 are mounted in the mounting groove 16, and the LED lamp panel 2 is electrically connected to the driving power supply 3. The quick disassembling structure is configured to detachably connect the light transmitting panel 4 to the lamp body 1.

By providing the above-mentioned quick disassembling structure, when the light transmitting panel 4 or the LED lamp panel 2 needs to be replaced, the light transmitting panel 4 can be quickly removed from the lamp body 1 without any additional tools, and the light transmitting panel 4 or LED lamp panel 2 can be replaced.

At least two quick disassembling structures are provided, so that the light transmitting panel 4 can be fixed to the lamp body 1 more stably.

The quick disassembling structure includes a locking member 5 provided on the lamp body 1 and an unlocking member 6 provided on the light transmitting panel 4. The locking member 5 is substantially "L"-shaped and includes a vertical plate 8 fixed to the lamp body 1 and a horizontal plate 7 connected to the vertical plate 8. The unlocking member 6 is an integrally formed buckle, and the unlocking member 6 is buckled with the horizontal plate 7.

The unlocking member 6 includes an elastic handle 9 and a locking block 10. The locking block 10 protrudes outwardly from a middle portion of the elastic handle 9 to form a step 11 between the locking block 10 and the elastic handle 9, and the step 11 is engaged with the horizontal plate 7. When the elastic handle 9 is pressed away from the vertical plate 8, the step 11 is disengaged from the horizontal plate 7.

The unlocking member 6 is substantially "U"-shaped. Certainly, the unlocking member 6 may be in another shape, as long as there is a space between the unlocking member 6 and the light transmitting panel 4 sufficient for the elastic handle 9 to move away from the vertical plate 8. For example, the unlocking member 6 may be a straight plate, one end of the straight plate is fixed to the light transmitting panel 4, and the other end of the light transmitting panel 4forms an angle with the light transmitting panel 4.

When the light transmitting panel 4 needs to be replaced, it is only necessary to manually press the elastic handle 9 of the unlocking member 6 away from the vertical plate 8, so as to enable the step 11 of the unlocking member 6 to be disengaged from the horizontal plate 7. At this time, the light transmitting panel 4 is disengaged from the lamp body 1, and the light transmitting panel 4 can be removed for replacement or maintenance without any additional tools. Correspondingly, when the light transmitting panel 4 needs to be mounted, the light transmitting panel 4 is placed in the mounting groove 16, and then the light transmitting panel 4 is pressed towards the LED lamp panel 2 to enable the step 11 to be engaged with the horizontal plate 7. At this time, the light transmitting panel 4 is fixed on the lamp body 1. The operation is simple and quick, and no additional tools are required.

The light transmitting panel 4 is a lens panel with a lens structure, and the light transmitting panel 4 covers the LED lamp panel 2.

When the LED lamp panel 2 needs to be replaced, it is only necessary to manually press the elastic handle 9 of the unlocking member 6 away from the vertical plate 8, so as to enable the step 11 of the unlocking member 6 to be disengaged from the horizontal plate 7. At this time, the light transmitting panel 4 is disengaged from the lamp body 1, the light transmitting panel 4 and the LED lamp panel 2 can be removed in sequence without any additional tools, and the LED lamp panel 2 can be replaced or maintained. Correspondingly, when the LED lamp panel 2 needs to be mounted, the LED lamp panel 2 and the light transmitting panel 4 are put into the mounting groove 16 in sequence, and then the light transmitting panel 4 is pressed towards the LED lamp panel 2 to enable the step 11 to be engaged with the horizontal plate 7. At this time, the LED lamp panel 2 is fixed on the lamp body 1. The operation is simple and quick, and no additional tools are required.

The LED lamp further includes a power supply box 12 buckled on a rear side of the lamp body 1. The driving power supply 3 is provided in the power supply box 12.

The LED lamp further includes a sealing ring 13 provided between the power supply box 12 and the lamp body 1, the power supply box 12 is provided with a sealing groove, and the sealing ring 13 is received in the sealing groove.

The LED lamp further includes a mounting bracket 14 connected to the lamp body 1 and a hanging ring 15 connected to the power supply box 12.

According to the above-mentioned LED, the light transmitting panel 4 and the LED lamp panel 2 can be removed manually for replacement or maintenance without any additional tools, and the operation is simple and convenient.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a lamp body provided with a mounting groove on a front side thereof;

an LED lamp panel mounted in the mounting groove;

a driving power supply electrically connected to the LED lamp panel and configured to power the LED lamp panel;

a light transmitting panel mounted in the mounting groove; and a quick disassembling structure through which the light transmitting panel being detachably connected to the lamp body;

wherein the quick disassembling structure comprises a locking member provided on the lamp body and an unlocking member provided on the light transmitting panel, the locking member comprises a vertical plate fixed on the lamp body and a horizontal plate connected to the vertical plate, the unlocking member is an integrally formed buckle buckled with the horizontal plate;

the unlocking member is substantially U-shaped and comprises an elastic handle and a locking block, the locking block protrudes outwardly from a middle portion of the elastic handle to form a step between the locking block and the elastic handle, the step is engaged with the horizontal plate, when the elastic handle is pressed away from the vertical plate, the step is disengaged from the horizontal plate, so that the light transmitting panel is disengaged from the lamp body.

2. The LED lamp according to claim 1, wherein at least two quick disassembling structures are provided.

3. The LED lamp according to claim 1, wherein the light transmitting panel is a lens panel.

4. The LED lamp according to claim 1, wherein the light transmitting panel covers the LED lamp panel.

5. The LED lamp according to claim 1, further comprising a power supply box mounted on a rear side of the lamp body, wherein the driving power supply is provided in the power supply box.

6. The LED lamp according to claim 5, wherein the power supply box is buckled with the lamp body.

7. The LED lamp according to claim 6, further comprising a sealing ring provided between the power supply box and the lamp body, the power supply box is provided with a sealing groove, and the sealing ring is received in the sealing groove.

8. The LED lamp according to claim 7, further comprising a mounting bracket connected to the lamp body and a hanging ring connected to the power supply box.

* * * * *